(12) United States Patent
Coleman et al.

(10) Patent No.: US 7,717,694 B2
(45) Date of Patent: May 18, 2010

(54) METHOD AND APPARATUS FOR TENSIONING COMPOSITE MATERIAL

(75) Inventors: Robert A. Coleman, Mulvane, KS (US); Timothy D. King, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 176 days.

(21) Appl. No.: 11/853,660

(22) Filed: Sep. 11, 2007

(65) Prior Publication Data

US 2009/0065963 A1 Mar. 12, 2009

(51) Int. Cl.
*B29C 43/36* (2006.01)
(52) U.S. Cl. .................. 425/389; 425/468; 425/472
(58) Field of Classification Search .............. 425/389, 425/393, 394, 468, 472; 38/44, 70, 99, 100, 38/102; 112/470.31; 269/80, 126, 129
See application file for complete search history.

(56) References Cited

U.S. PATENT DOCUMENTS

| | | | |
|---|---|---|---|
| 1,700,051 A * | 1/1929 | Hinote | .................. 29/246 |
| 2,441,097 A | 5/1948 | Hicks | |
| 3,492,392 A | 1/1970 | Kasamatsu et al. | |
| 3,630,511 A * | 12/1971 | Evans et al. | .................. 269/43 |
| 3,673,295 A | 6/1972 | Winchklhofer et al. | |
| 3,784,441 A | 1/1974 | Kaempen | |
| 3,955,266 A | 5/1976 | Honami et al. | |
| 4,566,304 A * | 1/1986 | Van Cleave et al. | ........... 72/319 |
| 4,608,220 A | 8/1986 | Caldwell | |
| 4,740,417 A | 4/1988 | Tornero | |
| 4,786,351 A | 11/1988 | Elliott et al. | |
| 4,883,632 A | 11/1989 | Goto et al. | |
| 4,943,222 A | 7/1990 | Nathoo | |
| 4,946,640 A | 8/1990 | Nathoo | |
| 4,973,234 A | 11/1990 | Swenson | |
| 5,035,758 A | 7/1991 | Degler et al. | |
| 5,128,090 A | 7/1992 | Fujji et al. | |
| 5,209,891 A | 5/1993 | Guarriello et al. | |
| 5,318,422 A | 6/1994 | Erland | |
| 5,380,480 A | 1/1995 | Okine et al. | |
| 5,449,429 A | 9/1995 | Langenbrunner | |
| 5,463,794 A | 11/1995 | Erland | |
| 5,641,525 A | 6/1997 | Yakel | |
| 5,713,682 A * | 2/1998 | Clark et al. | .................. 402/7 |

(Continued)

FOREIGN PATENT DOCUMENTS

WO WO/2008/070621 6/2008

*Primary Examiner*—Joseph S Del Sole
*Assistant Examiner*—James Sanders
(74) *Attorney, Agent, or Firm*—Hovey Williams LLP

(57) ABSTRACT

An apparatus and method for tensioning material (12) over a mold (14), such as a cure tool, comprises a tensioning fork (10) consisting of two substantially parallel tapered legs (18, 20) between which material (12) is disposed. A tensioning fork (10) is positioned at a first side edge (42) and proximate a first end edge (38) of the material (12). A first leg (18) of the tensioning fork (10) is disposed under the material (12), and a second leg (20) of the tensioning fork (10) is disposed over the material (12). When force is applied to the second leg (20), it pivots about the first leg (18) along the length of the legs, remaining parallel to the first leg (18), thereby pressing a portion of the material (12) against the mold (14).

16 Claims, 5 Drawing Sheets

U.S. PATENT DOCUMENTS

| | | |
|---|---|---|
| 5,743,979 A | 4/1998 | Lorbiecki |
| 5,882,462 A | 3/1999 | Donecker et al. |
| 5,900,093 A | 5/1999 | Langenbrunner |
| 5,925,302 A | 7/1999 | Oono et al. |
| 6,132,666 A | 10/2000 | Foley et al. |
| 2007/0108665 A1 | 5/2007 | Glain et al. |
| 2008/0283177 A1 | 11/2008 | Glain et al. |

\* cited by examiner

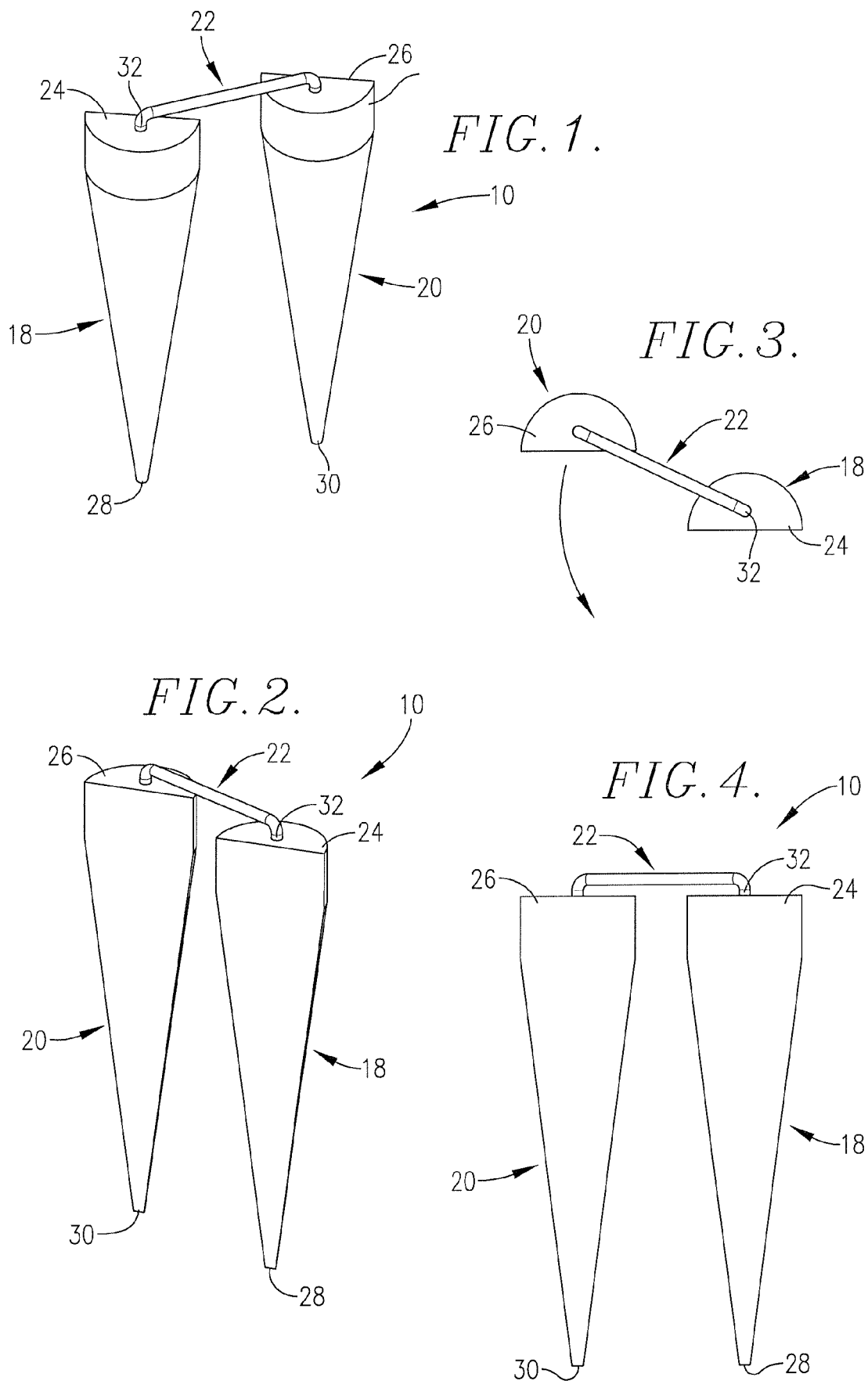

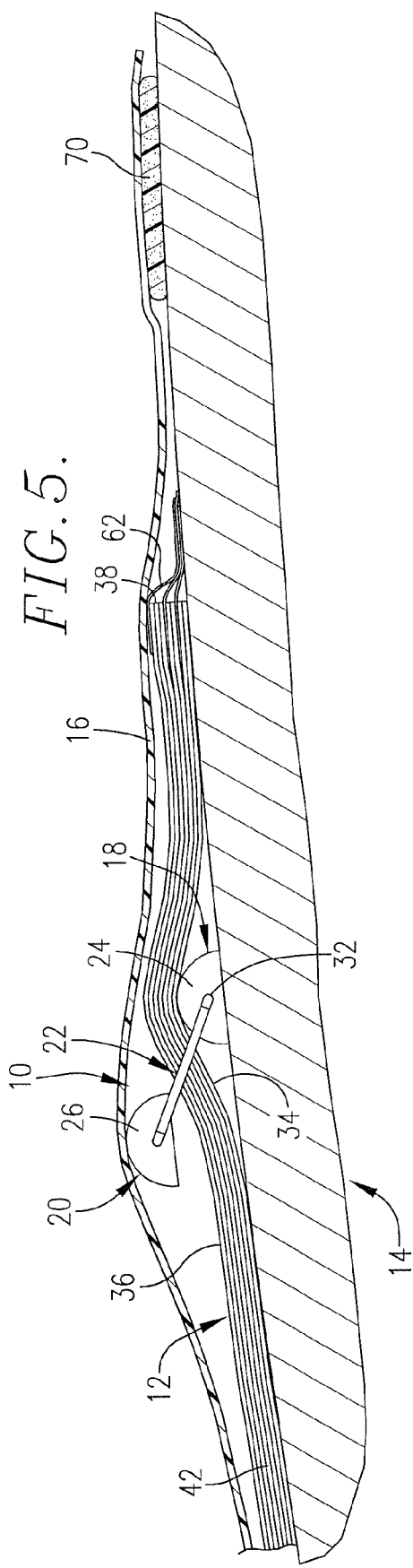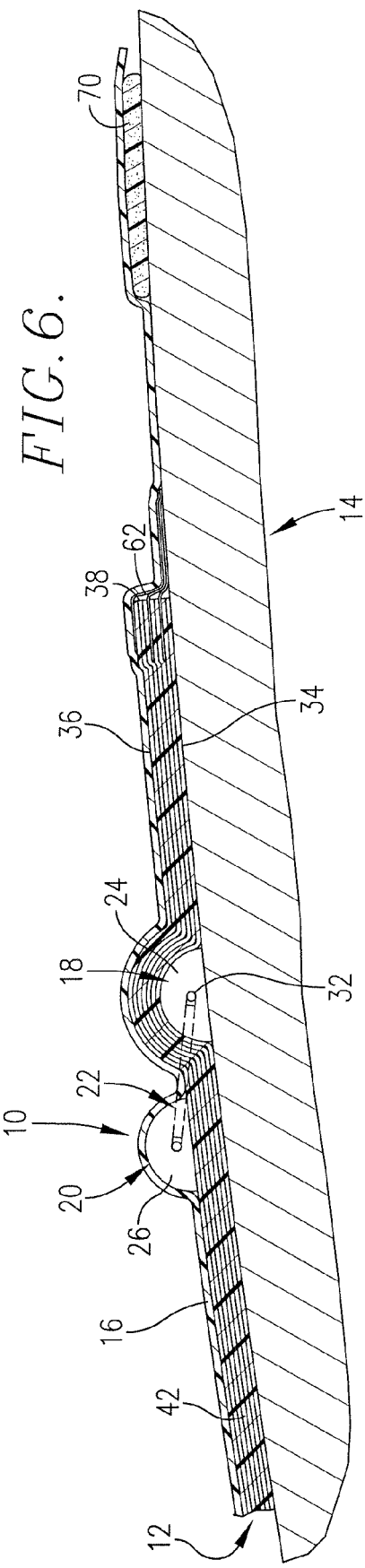

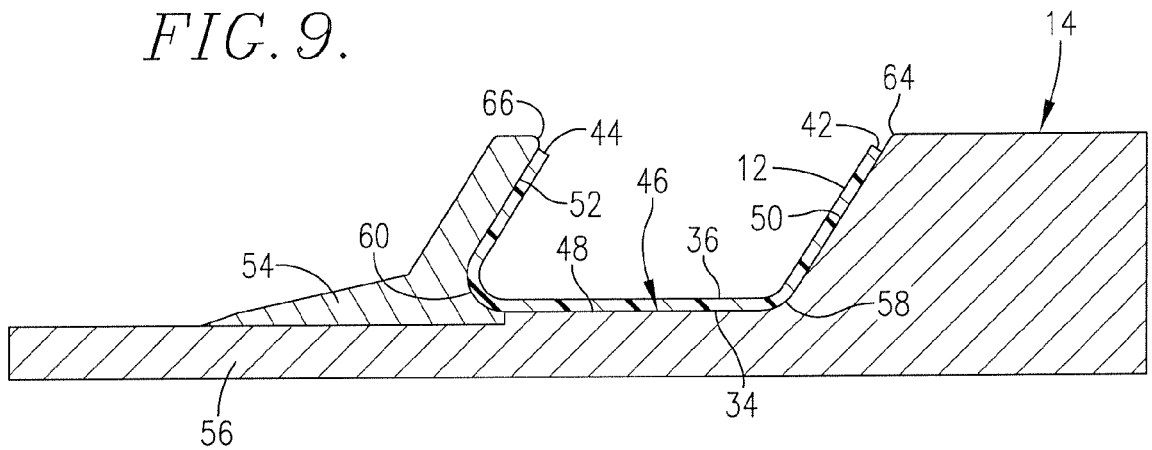
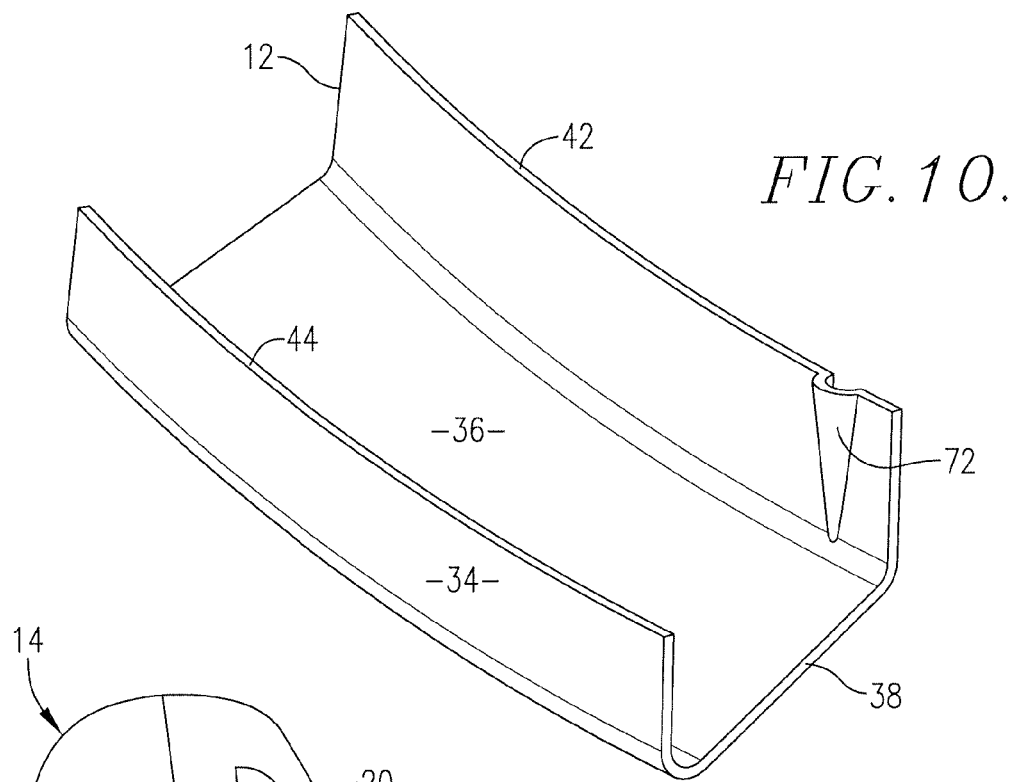
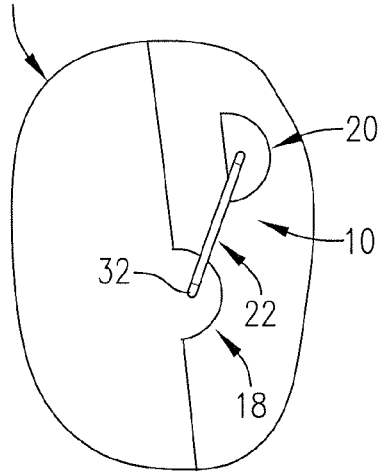

METHOD AND APPARATUS FOR TENSIONING COMPOSITE MATERIAL

BACKGROUND

1. Field

The present invention relates to composite materials. More particularly, the invention relates to tensioning composite material during a curing process.

2. Related Art

Composite parts for use in airplanes and other applications may be made from braided preform composite material that undergoes forming and curing processes. Forming and curing processes may involve, for example, severing a piece of braided preform composite material from a mandrel; securing the material to a mold, such as a cure tool surface; impregnating the material with resin; positioning an airtight lining, such as a cure bag, over the composite material and resin; creating a vacuum between the airtight lining and the mold surface to compress the material and resin; and applying heat to the material, resin, and airtight lining. The mold may include a C-channel, typically comprising an elongated channel with a bottom wall, an inner upwardly extending side wall, and an outer upwardly extending side wall.

The C-channel can be curved in various planes, and the upwardly extending side walls may be integrally formed or otherwise joined to the bottom wall at 90° angles or non-90° angles. In one instance, the C-channel is curved along its length with the inner wall formed along an inner radius of the curve and the outer wall formed along an outer radius of the curve. When material is pressed against inner surfaces of the C-channel and then tensioned and compressed, undesirable wrinkles or aberrations can form in the material. This is due to the difference in path lengths between the material at the inner radius of the curve and the material at the outer radius of the curve. These wrinkles are more pronounced closer to a side edge of the material along the inner radius. In a curved C-channel, wrinkles typically form along the inner wall.

SUMMARY

A method and apparatus for tensioning a material over a mold to eliminate the formation of wrinkles, depressions, or other aberrations during vacuum compression is disclosed. According to this method, at least one tensioning fork is positioned against at least a portion of the material to exact tension on the material when force is applied to the tensioning fork.

In various embodiments, the tensioning fork has a first tapered leg, a second tapered leg, and a joining arm. The tapered legs each have a wide end and a narrow end and are tapered in a generally conical manner. An elongated portion of each tapered leg may be generally flat on one side. The joining arm spans the distance between the first tapered leg and the second tapered leg, such that the legs are fixed substantially parallel to each other. At least one of the tapered legs is pivotally secured to the joining arm.

The method of using the tensioning fork to tension material comprises the steps of forming material over a mold, such as a cure tool; positioning the first tapered leg between the mold and the material; and positioning the second tapered leg against a top face of the material. Next, the method comprises the steps of positioning a force-exacting component, such as an airtight lining, over the mold and material combination and exacting force on the second leg by compressing the force-exacting component toward the mold. This compression force urges the second leg to pivot towards the mold, thereby pressing a portion of the material against the mold to tension the material disposed between the first leg and the second leg. The final step of the method comprises applying heat to cure the material.

BRIEF DESCRIPTION OF THE DRAWINGS

Preferred embodiments of the invention are described in detail below with reference to the attached drawing figures, wherein, FIG. 1 is a perspective view of a front of a tensioning fork;

FIG. 2 is a perspective view of a rear of the tensioning fork;

FIG. 3 is a plan view of the tensioning fork;

FIG. 4 is a rear view of the tensioning fork;

FIG. 5 is a plan view of a horizontal, cross-sectional segment of a material anchored to a mold, interposed between two legs of the tensioning fork, and covered by an uncompressed force-exacting component;

FIG. 6 is a plan view of a horizontal, cross-sectional segment of the material anchored to the mold, interposed between the two legs of the tensioning fork, and covered by a compressed force-exacting component;

FIG. 9 is an end view of the material positioned in the C-channel;

FIG. 10 is a perspective view of a section of the material after it is cured and the tensioning fork is removed; and FIG. 11 is a fragmentary, top view of an alternative embodiment of the tensioning fork in which a first leg of the tensioning fork is integral with the mold.

DETAILED DESCRIPTION

Figure 7:
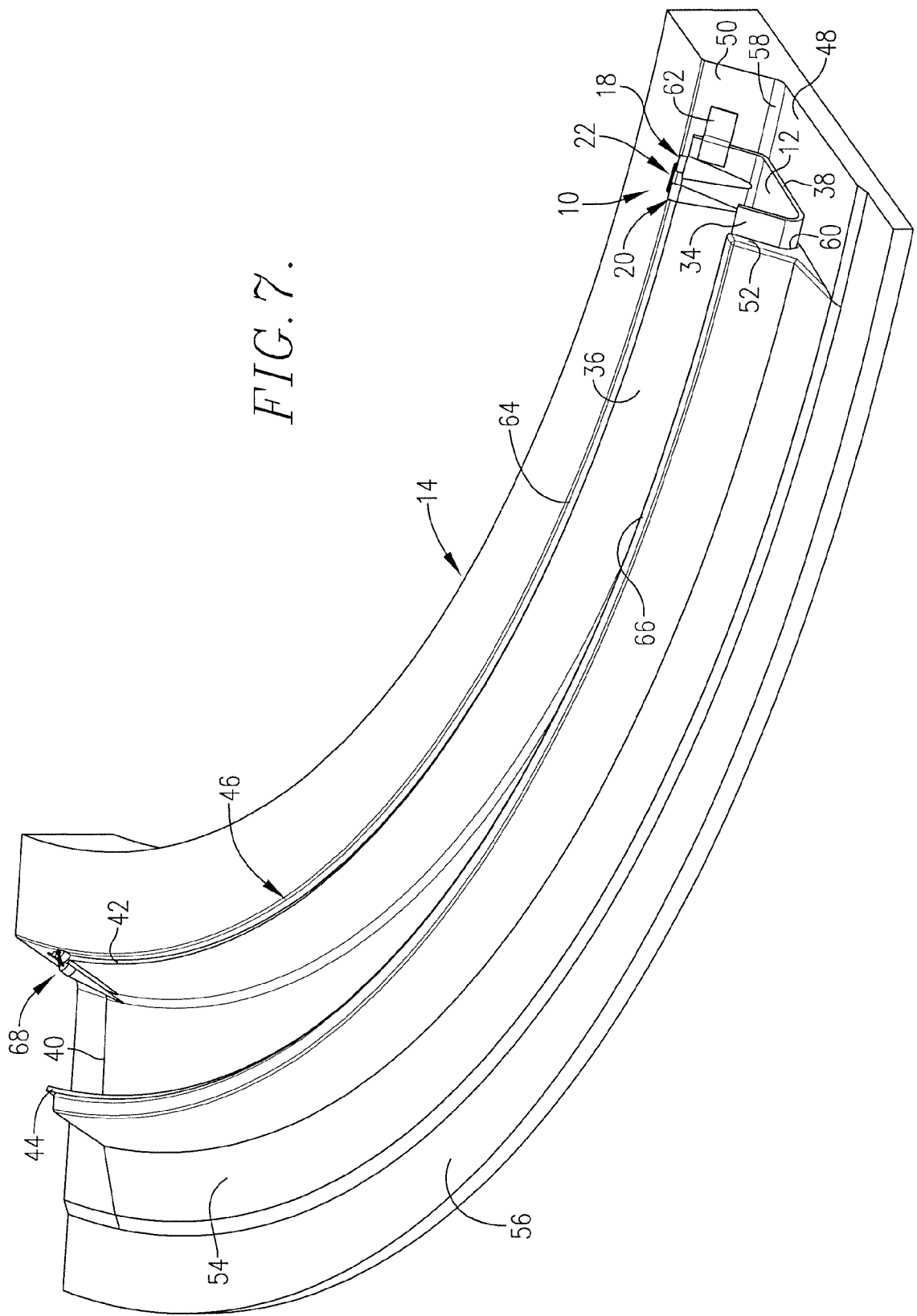
FIG. 7 is a perspective view of the mold and further illustrating a C-channel of the mold with material disposed therein and tensioning forks positioned on opposing ends of the C-channel.

Referring to FIGS. 1-7, the present invention is an apparatus comprising a tensioning fork 10 that may be used in a method of tensioning a material 12 over a mold 14. The tensioning fork 10 of the present invention is used to tension the material 12 via a method comprising the steps of forming the material 12 over the mold 14; positioning the tensioning fork 10 against the material 12; positioning a force-exacting component 16, such as a cure bag or airtight liner, over the mold 14 and material 12 combination; exacting a vacuum force to compress the force-exacting component 16 and material 12 to the mold 14; and applying heat to cure the material 12.

Referring to FIGS. 1-4, the tensioning fork 10 comprises a first leg 18, a second leg 20, and a joining arm 22. The tensioning fork 10 may be made from high temperature TEFLON® or any suitably rigid material. The legs 18,20 are fixed substantially parallel by the joining arm 22. The first leg 18 and the second leg 20 may each be tapered from a wide end 24,26 to a narrow end 28,30. Referring to FIG. 1, the first and second legs 18,20 are tapered in a generally conical shape. Referring to FIG. 2, an elongated portion of the first leg 18 and the second leg 20 is substantially flat.

The diameters of the tapered legs 18,20 may be determined by the material area and density requiring tension. For example, if the material 12 needs 0.250" added tension, the maximum diameter of the first leg 18 would be about 0.250" to 0.270". The diameters at the narrow ends 28,30 of the tapered legs may be as small as possible without creating a point sufficiently sharp to puncture the force-exacting component 16.

The joining arm 22 of the tensioning fork 10 is operable to allow at least one of the legs 18,20 to pivot about the other leg 22,20 along a length of the leg, as illustrated in FIG. 3. For example, in various embodiments, a pivot 32 at the wide end 24 of the first leg 18 is rotatably attached to the joining arm 22, allowing the second leg 20 to pivot 3600 about the first leg 18 with the direction of rotation, illustrated in FIG. 3, being about the length of the first leg 18. The second leg 20 is uniformly spaced from the first leg 18 throughout the 360° rotation due to the joining arm 22.

Because the tensioning fork 10 is positioned on the material 12 in the method of the present invention, a description of the material 12 and its positioning over the mold 14 is provided. The material 12 tensioned by the fork 10 is positioned over the mold 14, such that the material 12 has a bottom face 34 oriented towards the mold 14, a top face 36 oriented away from the mold 14, first and second end edges 38,40, and first and second side edges 42,44. Material 12 is commonly a composite material that is generally pliable, such as a braided preform. The mold 14 may be a cure tool, though other types of molds may be used.

Referring to FIG. 7, the mold 14 includes a C-channel 46 having a bottom wall 48 and inner and outer upwardly extending side walls 50,52. The C-channel 46 may be integrally formed or alternatively, formed from multiple individual mold pieces 54,56, as shown in FIG. 9. The individual mold pieces 54,56 may be interconnected by fasteners, welding, or any method well-known in the art. The C-channel 46 is substantially curved, such that it forms inner and outer radii. The inner wall 50 forms at an inner radius 58 of the curve and the outer wall 52 forms at an outer radius 60 of the curve.

The C-channel's walls 50,52 may be fixed or positioned relative to the bottom wall 48 of the C-channel 46 at 90° angles. Alternatively, as illustrated in FIG. 9, the C-channel's walls 50,52 may be fixed or positioned relative to the bottom wall 48 of the C-channel 46 at non-90° angles. For example, the C-channel's outer wall 52 may intersect at a 60° angle with the bottom wall 48 of the C-channel 46, while the C-channel's inner wall 50 may intersect with the bottom wall 48 of the C-channel 46 at a 120° angle.

In operation, the tensioning fork 10 of the present invention is used in a method comprising the steps of forming the material 12 over the mold 14; positioning the tensioning fork 10 against the material 12; positioning a force-exacting component 16, such as a cure bag, over the mold 14 and material 12 combination; exacting a vacuum force to compress the force-exacting component 16 and material 12 to the mold 14; and applying heat to cure the material 12. Referring to FIGS. 5-8, the material 12 is first formed to the mold by positioning the material 12 flush against the mold 14 and anchoring it to the mold 14 using anchoring devices 62, such as tape for anchoring braided preform composite material to a cure tool or any other suitable anchoring device for anchoring material to a mold 14. The anchoring devices 62 are positioned at opposing ends of the mold 14, although only one of the devices is illustrated in FIGS. 5-6. In various embodiments, the material 12 is positioned flush against the bottom wall 48 of the C-channel and the side walls 50,52. The first and second side edges 42,44 of the material 12 are adjacent to first and second top edges 64,66 of the side walls 50,52 respectively.

Next, the tensioning fork 10 is positioned against the first side edge 42 of the material 12 proximate to the first end edge 38 of the material. The joining arm 22 of the tensioning fork 10 is adjacent the first side edge 42 and the legs 18,20 extend generally perpendicular to a length of the material 12. Thus, a portion of the material 12 is interposed between the legs 18,20 of the tensioning fork 10, as illustrated in FIG. 5. The second leg 20 is adjacent the top face 36 of the material 12, with the elongated flat portion of the second leg 20 positioned flush against the material 12. The first leg 18 is adjacent the bottom face 34 of the material and is interposed between the mold 14 and the material 12, with the elongated flat portion of the first leg 18 positioned flush against the mold 14. When the material 12 is interposed between the tensioning fork legs 18,20, the joining arm 22 traverses the thickness of either the first or the second side edge 42,44. The first leg 18 is positioned closer to the anchoring devices 62 than the second leg 20.

Figure 8:
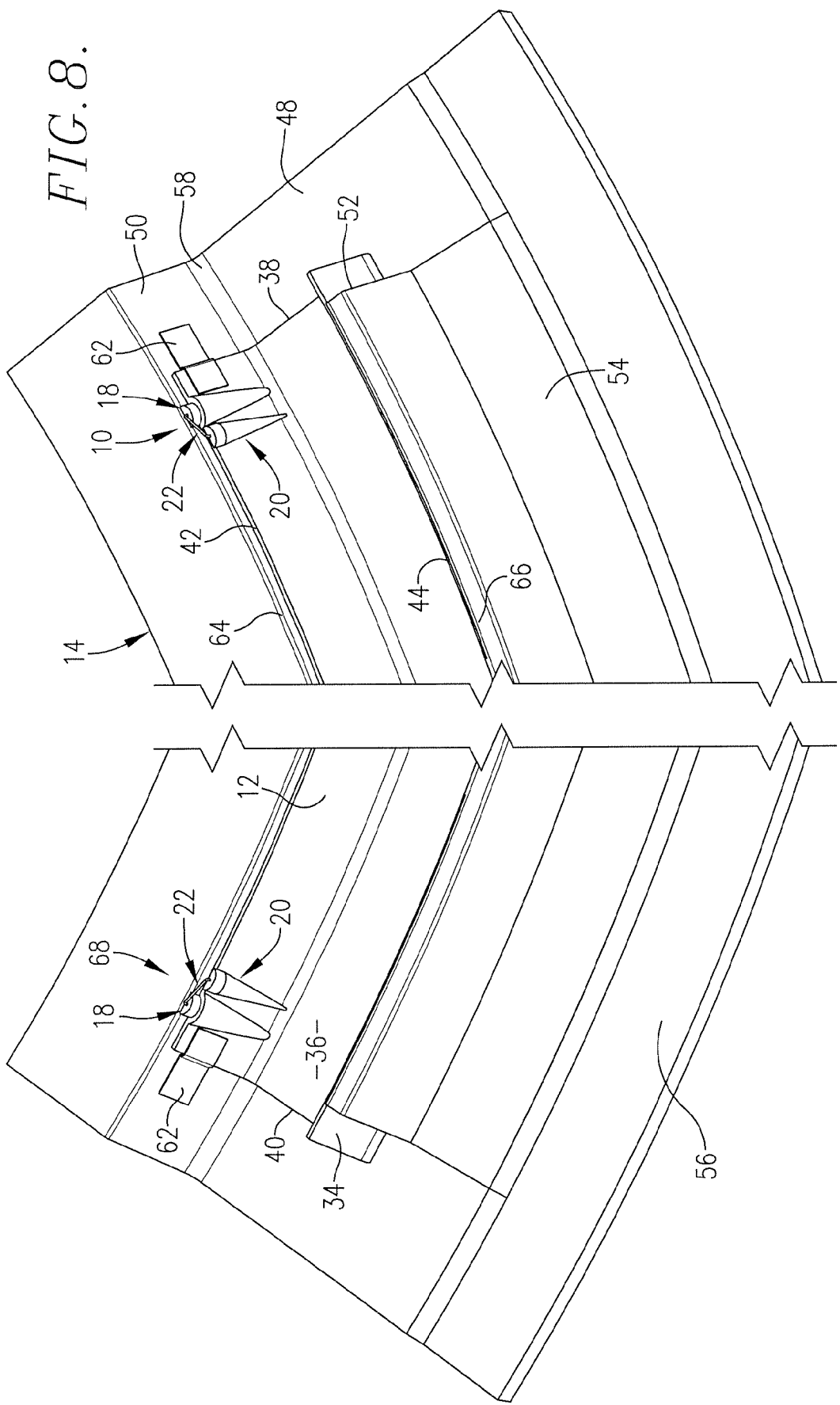
FIG. 8 is a fragmentary, perspective view of the mold having the C-channel with material disposed therein and tensioning forks positioned on opposing ends of the C-channel.

Referring to FIGS. 7-8, a second tensioning fork 68 may also be positioned at the first side edge 42 of the material 12. The second tensioning fork 68 is positioned proximate to the second end edge 40, opposite the tensioning fork 10 positioned proximate to the first end edge 38, as illustrated in FIG. 7. Both tensioning forks 10,68 tension the material 12 in an identical manner.

The force-exacting component 16, such as a cure bag or airtight liner, is then positioned over the mold 14 and material 12 combination. The force-exacting component 16 illustrated in FIGS. 5-6 is positioned over at least the top face 36 and all edges 38-44 of the material 12 and the tensioning fork 10. Each edge of the force-exacting component 18 may be sealed against the mold 14 outward of the material 12 using a sealant 70.

Once the force-exacting component 16 is substantially sealed to the mold 14, a vacuum force removes air between the mold 14 and the force-exacting component 16, thereby compressing the force-exacting component 16 and material 12 to the mold 14. The force exacted by the force-exacting component 16 is sufficient to hold the tensioning forks 10,68 against the mold 14. The force exacted by the compressed force-exacting component 16 may be approximately 90 psi.

When a force, such as compression force of a cure bag, is applied to the second leg 20 of the tensioning fork 10, the second leg 20 pivots inwardly and towards the mold 14, pressing a portion of the material 12 against the mold 14. The first leg 18 is disposed between the mold 14 and the material 12, so at least part of the first leg 18 protrudes outward from the plane of the mold 14, creating a bulwark across which the material 12 is tensioned. Therefore, during compression, the second leg 20 forces the material 12 towards the mold 14 while the first leg 18 forces the material 12 away from the mold 14. Thus, the second leg 20 exacts force in one direction on the material 12 while the first leg 18 exacts force on the material 12 in the opposite direction, thereby tensioning the material 12.

In relation to the curved C-channel 46, the tensioning forks 10,68 are positioned on the first side edge 42 of the material 12 adjacent to the inner wall 50 of the C-channel 46. Because the C-channel 46 is curved, it has a shorter path length at the inner radius 58 and a longer path length at the outer radius 60. This results in excess fabric forming vertical wrinkles or aberrations along the inner radius 58 of the curve during compression. Therefore, the tapered legs 18,20 provide tension closest to the first side edge 42 of the material 12 along the inner wall 50. More specifically, the wide ends 24,26 exact a greater amount of tension at the first side edge 42 of the material 12 adjacent the inner wall 50, and the narrow ends 28,30 exact a smaller amount of tension closer to the material 12 adjacent the bottom wall 48 of the C-channel 46, where less additional tensioning is required.

After compression, heat is applied to the force-exacting component 16, the material 12, and the tensioning fork 10 during a cure process. FIG. 10 illustrates a portion of the material 12 after it is cured using any curing method known in the art. The cured material 12 is substantially rigid and shaped like the mold 14, including a ridge 72 formed by the tensioning fork 10.

Although the invention has been described with reference to the embodiments illustrated in the attached drawings, it is noted that equivalents may be employed and substitutions made herein without departing from the scope of the invention as recited in the claims. For example, the first leg 18 of the tensioning fork 10 can be integral to the mold 14 as opposed to the fork 10 being a unitary, separate structure. Referring to FIG. 11, the first leg 18 is a permanent mold feature and forms a bulwark or protuberance with the pivot 32 at one end to be rotatably attached to the joining arm 22. In this embodiment, the second leg 20 operates in the same manner as other embodiments described herein.

Having thus described an embodiment of the invention, what is claimed as new and desired to be protected by Letters Patent includes the following:

1. A tensioning apparatus operable to tension material the tensioning apparatus comprising:
    a tensioning fork including:
        a first tapered leg having a wide end and a narrow end;
        a second tapered leg having a wide end and a narrow end, the second tapered leg being substantially parallel to the first tapered leg; and
        a joining arm spanning a distance between the first tapered leg and the second tapered leg and secured to the wide ends of the legs, the joining arm being pivotally secured to at least one of the tapered legs;
    a mold adjacent to at least a portion of an elongated section of the first tapered leg, wherein a material is disposed over at least a portion of the mold and the first tapered leg, with the second tapered leg positioned against an outer face of the material; and
    a force-exacting component positioned over the tensioning fork and configured for urging the second tapered leg toward said mold such that a portion of the material disposed between the first and second leg is pressed against the mold.

2. The tensioning apparatus of claim 1, wherein a portion of an elongated section of the first leg and the second leg is substantially flat.

3. The tensioning apparatus of claim 1, wherein the mold is a cure tool and the force-exacting component is an airtight liner sealed to the mold and configured to be compressed toward the tensioning fork and the mold by vacuum force.

4. The tensioning apparatus of claim 1, wherein a curved C-channel is formed in the mold, the C-channel comprising a bottom wall, an inner upwardly extending side wall along an inner radius of the C-channel, and an outer upwardly extending side wall along an outer radius of the C-channel.

5. The tensioning apparatus of claim 1, wherein the first tapered leg is integral to said mold.

6. A tensioning apparatus comprising:
    a tensioning fork, including,
        a first tapered leg having a wide end and a narrow end,
        a second tapered leg spaced a distance from the first tapered leg and having a wide end and a narrow end, and
        a joining arm spanning a distance between the first tapered leg and the second tapered leg and secured to the wide ends of the legs, the joining arm being pivotally secured to at least one of the tapered legs;
    a mold adjacent to at least a portion of an elongated section of the first tapered leg, wherein a material is disposed over at least a portion of the mold and the first tapered leg, with the second tapered leg positioned against an outer face of the material; and
    a force-exacting component for urging the second tapered leg toward said mold, whereby a portion of the material disposed between the first and second leg is pressed against the mold.

7. The tensioning apparatus of claim 6, wherein a portion of an elongated section of the first tapered leg and the second tapered leg is substantially flat.

8. The tensioning apparatus of claim 6, wherein the material positioned over the mold and the first tapered leg is braided preform composite material and the mold is a cure tool.

9. The tensioning apparatus of claim 6, wherein the force-exacting component is an airtight liner operable to be compressed by vacuum force.

10. The tensioning apparatus of claim 6, wherein the mold is substantially curved.

11. The tensioning apparatus of claim 10, wherein a curved C-channel is formed in the mold, the C-channel comprising a bottom wall, an inner upwardly extending side wall along an inner radius of the C-channel, and an outer upwardly extending side wall along an outer radius of the C-channel.

12. The tensioning apparatus of claim 11, wherein the side walls intersect with the bottom wall at non-90° angles.

13. The tensioning apparatus of claim 11, wherein at least one tensioning fork is positioned adjacent to the material along the inner wall of the C-channel.

14. The tensioning apparatus of claim 6, wherein the first tapered leg is integral to said mold.

15. The tensioning apparatus of claim 4, wherein the upwardly extending side walls intersect with the bottom wall at non-90° angles.

16. The tensioning apparatus of claim 4, wherein the tensioning fork is positioned adjacent the inner upwardly extending side wall of the C-channel.

* * * * *